Dec. 21, 1965     F. E. BENJAMIN     3,224,793
SWIVEL MOUNTING FOR AERATING DEVICE OR THE LIKE
Filed July 13, 1961
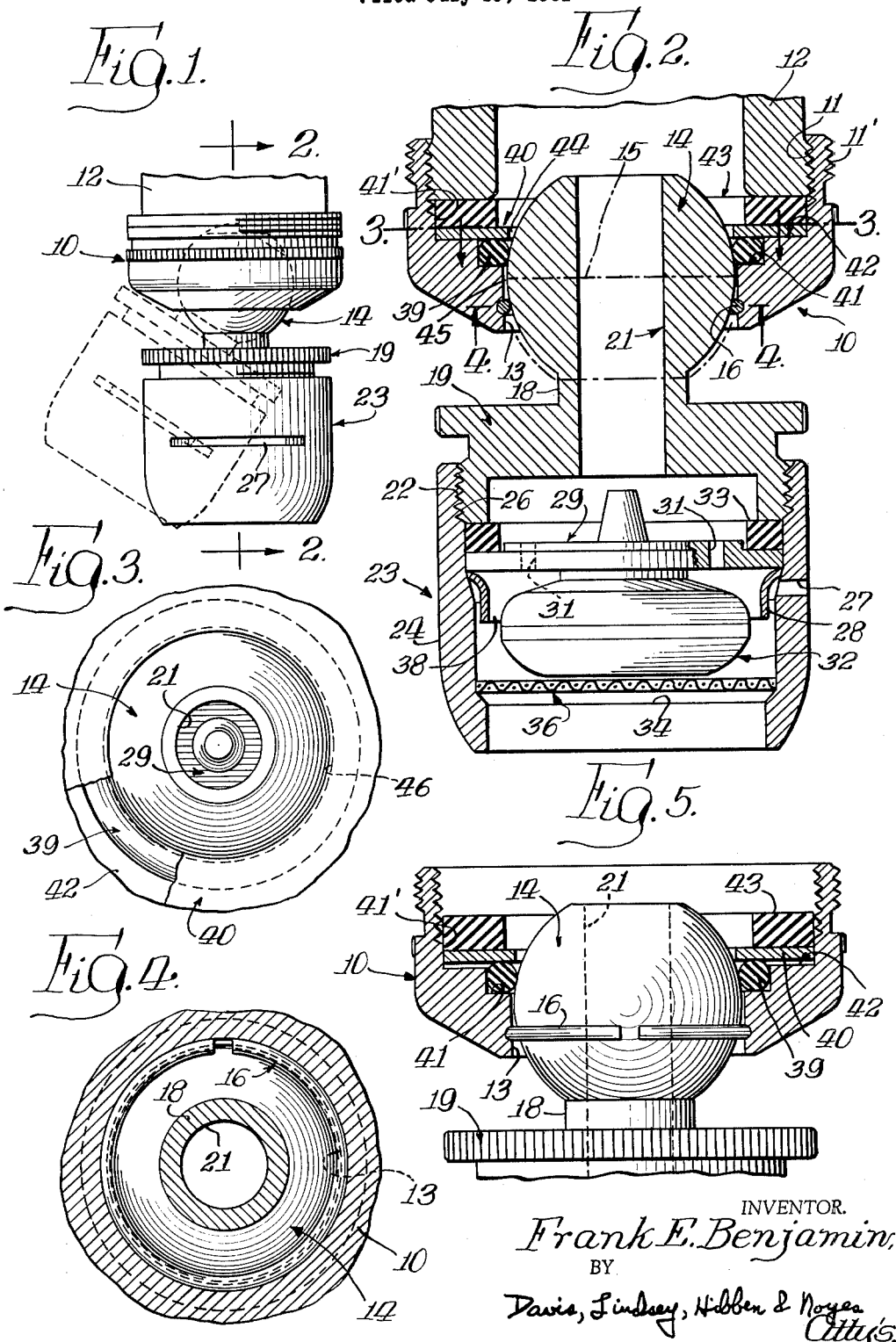
INVENTOR.
Frank E. Benjamin,
BY
Davis, Lindsey, Hibben & Noyes
Attys.

United States Patent Office 3,224,793
Patented Dec. 21, 1965

3,224,793
SWIVEL MOUNTING FOR AERATING DEVICE OR THE LIKE
Frank E. Benjamin, Chicago Heights, Ill., assignor to Wrightway Engineering Co., Chicago, Ill., a corporation of Illinois
Filed July 13, 1961, Ser. No. 123,823
2 Claims. (Cl. 285—8)

This invention relates to an improved swivel or ball joint mounting for a liquid discharge device of the type adapted to be connected to a water faucet or the like. More particularly, the invention relates to a novel and improved swivel mounting means for an aerating device.

Aerating devices for mixing water and air are now widely known and used on faucets and other water outlets. Such devices are highly useful and advantageous since in their preferred form they produce a soft, bubbly, coherent stream which is non-splashing and which contains a large amount of entrained air.

In the case of water outlets on kitchen sinks and the like, it is also desirable to have some type of adjustable means for directing a stream of water from the faucet at different angles so as to reach all parts of the sink or work area. For example, a swingable faucet mounting is frequently used but such devices, while they represent an improvement over the stationary faucet, are movable over only a limited arcuate path. Another device commonly provided is the flexible hose and spray head arrangement which is connected to the water supply line by means of a pressure responsive diverter valve. By manipulation of a control valve in the spray head, the pressure responsive diverter valve is actuated so that the water stream can be selectively directed either through the main faucet outlet in the ordinary manner or through the spray head for reaching remote areas of the sink and adjacent work area. However, the diverter spray arrangement represents an added item of substantial expense and, furthermore, presents the possibility of back siphoning of dirty water if the spray head is accidentally left in the sink with a resultant serious danger of contaminating the fresh water supply.

The present invention provides a novel swivel type or ball joint mounting for an aerating device or other liquid discharge device so as to meet the requirements of an adjustable aerator while at the same time avoiding the disadvantages of the arrangements heretofore used. Although swivel mountings are known in the case of various liquid discharge devices such as shower heads, sprays, and aerators, the usual ball-joint connectors heretofore employed have been subject to certain disadvantages, particularly with respect to the fluid seal for the ball joint. For example, such prior arrangements have been subject to undesirable leakage due to unintentional displacement of the ball member in its socket and have also been subject to excessive frictional tightness when screwed onto a faucet.

Accordingly, a primary object of the invention is to provide a novel and improved swivel mounting means for an aerator or the like.

A further object of the invention is to provide a novel and improved fluid seal arrangement in a swivel mounting for use with an aerating device or the like.

Another object of the invention is to provide a novel swivel mounting for an aerator or the like which is characterized by its ability to be easily swiveled without fluid leakage.

Still another object of the invention is to provide a novel swivel mounting for an aerator or the like which may easily be mounted on a faucet with no danger of producing excessive frictional resistance to normal swiveling movement.

An additional object of the invention is to provide a novel and improved combination of a ball joint mounting and an O-ring seal for use with an aerator or the like.

A still further object of the invention is to provide a novel and improved ball joint and O-ring combination such that the possibility of accidental movement of the ball portion in any direction to cause leakage about the periphery of the ball portion is minimized.

Other objects and advantages of the invention will become apparent from the subsequent detailed description taken in conjunction with the accompanying drawing, wherein:

FIGURE 1 is a side elevational view of an aerator device having a mounting comprising a specific embodiment of the invention;

FIGURE 2 is a longitudinal sectional view on an enlarged scale as taken along the line 2—2 of FIGURE 1;

FIGURE 3 is a fragmentary transverse sectional view taken along the line 3—3 of FIGURE 2;

FIGURE 4 is a fragmentary transverse sectional view taken along the line 4—4 of FIGURE 2; and FIGURE 5 is a fragmentary longitudinal sectional view similar to FIGURE 2 but showing the swivel mounting means before the mounting and tightening thereof on a faucet outlet.

In accordance with the invention, the mounting means for the aerating device comprises a ball and socket joint with the socket member adapted to be threaded onto a faucet outlet. A snap ring or other retaining means engages the ball member at one side of the equatorial plane thereof in order to position the ball member within the socket member. The socket member is provided with an annular recess or groove spaced from the snap ring a distance sufficient to position the recess at the opposite side of the equatorial plane of the ball member, and an O-ring is positioned within the annular recess and engages the ball member in fluid sealing relationship. The O-ring is engaged at one side thereof by the base of the recess or groove and at the other side thereof by a washer or compression member. The washer is arranged to seat against a shoulder adjacent the recess so that when the socket member is securely threaded onto a faucet outlet, compression of the O-ring is limited to a certain predetermined amount. The predetermined limit of compression of the O-ring is one which will provide adequate sealing of the ball and socket members to prevent fluid leakage while yet permitting easy manual swiveling of the aerator device for directing the outlet of the aerator at different angles to the axis of the faucet outlet. The washer or compression member for the O-ring also functions to prevent accidental extrusion of the O-ring from the annular recess by excessive tightening of the socket member on the faucet outlet. The straddling of the equatorial plane of the ball member by the snap ring and the O-ring tends to prevent accidential unseating of the ball member from the O-ring which would cause undesirable leakage of fluid.

Referring now to the drawing, the ball and socket swivel mounting arrangement of the present invention comprises a generally cup-shaped socket member 10 having internal threads 11 for attachment to the externally threaded end 12 of a faucet or similar fluid supply conduit. The socket member 10 is also provided with external threads 11' for attachment to an internally threaded faucet outlet. The lower end of the socket member 10 is provided with an opening 13 for receiving a ball member 14 in close clearance swivel relation therein. In this instance, a split resilient spring ring 16 is carried in a groove in the opening 13 for retaining and positioning the ball member 14 in assembled relation with the socket member 10, but it will be understood that other means may be employed for restricting the opening 13 so as to retain the ball member within the socket member. The split ring 16 has an inner diameter which is less than the equatorial or largest diameter of the ball member 14. For convenient reference, the equatorial plane of the ball is designated by the dot-dash line 15 in FIG. 2 and comprises a plane extending through the maximum diameter of the ball member 14 at right angles to the central axis of the socket member 10.

The ball member 14 is only partially contained within the socket member 10 and the outwardly or downwardly projecting portion of the ball member 14 is formed with an integral reduced neck portion 18 and an enlarged generally cup-shaped connector portion 19. A fluid passage or bore 21 extends axially through the ball member 14 and the neck portion 18 for providing fluid communication between the supply conduit 12 and the interior of the cup-shaped connector portion 19. The connector 19, in this instance, is provided with external threads 22 for attachment to the inlet end of a generally tubular aerating device designated generally at 23.

Although any of the well known types of aerating devices may be used in connection with the swivel mounting arrangement of the present invention, the device is here illustrated in connection with an aerator having the same general characteristics and structure shown in Joseph J. Goodrie Patent No. 2,761,662. Thus, the aerator 23 comprises an outer tubular casing 24 having internal threads 26 at its inlet end for attachment to the connector 19. The wall of the casing 24 is formed with a plurality of lateral slots or openings 27 which serve as air inlet ports in the well known manner. A supporting ring or collar 28 is rigidly mounted in the casing 24 adjacent the inlet end thereof and extends downwardly in concentric inwardly spaced relation from the inner wall of the casing 24 so as to overlie and shield the slots 27. A disk 29 having a plurality of apertures 31 is loosely seated against the upper end of the collar 28 so as to be readily detachable therefrom. A depending breakup and mixing plug 32 is suspended centrally from the disk 29 and has a generally mushroom shape so that jets of water from the apertures 31 will impinge upon the plug 32 with the result that the water jets are broken up and mixed with entrained air entering the casing through the slots 27. A gasket 33 of rubber or the like is interposed between the disk 29 and the inner axial end of the cup-shaped connector 19 so as to provide a fluid-tight seal and thereby insure that water under pressure is forced through the apertures 31. The lower end of the casing 24 is formed with a tapered shoulder 34 which supports a screen or like foraminous member 36. The screen member 36 is frictionally retained by the inner wall of the casing 24 against the shoulder 34.

The operation of such aerating devices is well understood at this time and therefore need not be described in detail. It will suffice to say that water under pressure is forced through the apertures 31 in the disk 29 thereby creating a multiplicity of fine separate jets of water below the disk 29. Because of their discrete or relatively independent nature, these jets are entirely surrounded by air which freely enters the interior of the casing 24 through the slots 27. As the water jets pass downwardly while surrounded by air, the air becomes entrained in the jets and the latter then impinge against the plug 32 causing substantial splashing, breakup, and intimate mixing of water and air. It will be understood that the ring 28 effectively shields the slots 27 so as to prevent water from splashing out through or blocking the slots 27. The annular opening, designated at 38 in FIG. 2, between the collar 28 and the plug 32, has a greater area than the combined area of the openings 31 in the disk 29 so that there is no tendency for incoming water to collect in and fill up the space defined between the disk 29, the collar 28, and the plug 32. Consequently, proper impingement and breakup of the individual water jets and entrainment of the water therein are realized. At the outlet end of the casing 24, the screen 36, although not absolutely essential, serves to coalesce the aerated fluid into a coherent stream having soft, non-splashing characteristics.

In order to prevent leakage of fluid at the swivel joint and to permit easy swiveling of the aerator in accordance with the objects of the invention, an O-ring 39 and an annular compression member or washer 40 are provided. The O-ring 39 is formed of a resilient material such as rubber, and the washer 40 is formed of a substantially rigid material such as brass. The O-ring 39 is disposed in an annular groove or recess 41 formed in the inner wall of the socket portion 10 at a position spaced axially from the snap ring 16 a distance sufficient to position the O-ring 39 above but closely adjacent the equatorial plane 15 of the ball member 14 whereas the ring 16 engages the ball member 14 below the equatorial plane 15, as shown in FIG. 2.

The relaxed or uncompressed condition of the O-ring 39 is illustrated in FIG. 5 from which it may be seen that the O-ring 39 in cross section has an initial diameter somewhat greater than the depth or height of the vertical or axially extending side wall of the annular recess 41 and also somewhat greater than the width of the transverse end wall or base of the annular recess 41. The washer 40 is positioned within an enlarged counterbore 41' in the socket member 10 which provides a transversely disposed annular seat or shoulder 42 extending radially outwardly from the upper open end of the recess 41. The outer diameter of the washer 40 is great enought to overlie the shoulder 42, and the inner diameter of the washer 40 is small enough to overlie substantially all of the O-ring 39 but large enough to provide a slight clearance 44 between the washer and the ball member when the washer 40 engages the shoulder 42 of the socket member 10, as shown in FIG. 2. A compressible gasket 43 of rubber or the like is disposed above the washer 40 to engage the axial end of the conduit 12 so as to prevent leakage of water betewen the threaded portions of the socket member 10 and the conduit 12.

With the various parts disposed as above described and shown in FIG. 5, the socket member 10 is threaded onto the conduit 12 until the O-ring 39 and the gasket 43 are compressed as shown in FIG. 2. The dimensions of the O-ring 39 and the associated structure are such that the compressed O-ring substantially fills the space defined between the ball member 14, the washer 40, and the walls of the annular groove 41. In this condition, a fluid-tight seal is provided between the ball member 14 and the O-ring 39, but the extent of compression of the O-ring 39 is limited by the rigid engagement of the washer 40 with the shoulder 42 thereby eliminating any possibility of excessive frictional tightness of the swivel joint. The aerator 23 may then be swiveled to a position, such as shown in the dotted lines in FIG. 1, easily and without leakage of water between the socket member 10 and the ball member 14. Irrespective of the degree of tightness with which the socket member 10 is threaded onto the conduit 12, there can be no excessive frictional contact between the ball member 14 and the O-ring 39 to interfere with the easy manual swiveling of the aerator.

Furthermore, as previously described, the inner diameter of the washer 40 is such that the washer overlies substantially all of the O-ring 39 in either the relaxed FIG. 5 condition or the compressed FIG. 2 condition of the O-ring. Thus, the clearance, indicated at 44 in FIG. 2, between the ball member 14 and the washer 40 when the O-ring 39 is fully compressed is sufficiently restricted to preclude any substantial or detrimental extrusion of the O-ring upwardly through the space 44. Moreover, the close clearance, indicated at 45 in FIG. 2, between the wall of the socket opening 13 and the maximum diameter portion of the ball member 14 is also sufficiently restricted to prevent extrusion of the O-ring 39 downwardly therebetween.

In addition, an important feature of the assembled swivel joint is that the O-ring 39 and the retainer or spring ring 16 engage the ball member 14 at opposite sides of the equatorial plane 15. As a result, when the swivel joint is assembled and attached to an outlet as shown in FIG. 2, the O-ring 39 is always in fluid-sealed relation with respect to the ball member 14 and there is no reliance on the pressure of the discharge liquid from the outlet 12 to effect or augment the fluid seal. Since the maximum diameter portion of the ball member 14 is below or downstream from the O-ring 39, as seen in FIG. 2, it will be understood that an accidental upward force on the aerator 23 will be resisted by the compressed O-ring so as to avoid or minimize the chance of unseating the ball from its FIG. 2 position which would result in fluid leakage through the swivel joint. Moreover, as previously discussed, the inner diameter of the rigid washer 40 is such that the washer overlies substantially all of the O-ring 39. Consequently, the inner diameter of the washer 40 is slightly less than the maximum diameter of the ball member 14 so that the inner marginal portion of the washer 40 overlies the ball member 14 to a slight extent, as best seen at 46 in FIG. 3. Thus, a positive stop against accidental upward displacement of the ball member is provided by the rigid washer 40 in addition to the resistance to upward displacement provided by the compressed O-ring 39.

A further feature of the invention is that the O-ring 39 and the washer 40 are positioned not only above but also closely adjacent the equatorial plane 15 of the ball member 14 so as to prevent abrading engagement of the O-ring 39 by the upper edge of the bore 21 even in extreme swivel positions of the ball member 14, as shown in broken lines in FIG. 1. More specifically, as seen in FIG. 2, the location and dimensions of the groove 41, the O-ring 39, and the washer 40 are such that, in the fully tightened position of FIG. 2 with the washer 40 engaging the shoulder 42 and the bore 21 in coaxial alignment with the socket 13, the washer 40 is disposed approximately midway between the equatorial plane 15 and the upper end of the bore 21. Of course, the inner diameters of the washer 40 and the gasket 43 are such that in their respective locations there is always clearance relative to the ball member 14 in all positions of the latter.

At the same time, in the embodiment of the invention herein illustrated, the benefits and advantages of mounting the aerator on the ball member of the joint are also obtained. Thus, the aerator 24 is secured in fixed coaxial relation at the lower end of the fluid passage 21 so that, regardless of the angular or swivel position of the device, the fluid passage 21 is always in straight line flow relation with respect to the aerator 24 and the liquid supply is always directed substantially perpendicularly against the perforated disk 29–31 without loss of pressure or efficiency of operation of the aerator.

Although the invention has been described with particular reference to a certain specific structural embodiment thereof, it is to be understood that various modifications and alternatives may be resorted to without departing from the scope of the invention as defined in the appended claims.

I claim:
1. A swivel mounting for an aerator or the like comprising, in combination, a socket member having an axial opening therethrough, a ball member disposed in close clearance swivel relation in the opening of said socket member, said ball member having an axial bore therethrough with one end of the bore disposed within said socket member, retaining means at one end of said socket member coacting between said ball and socket members for retaining the same in assembled relation, said retaining means engaging said ball member at one side of an equatorial plane through said ball member, said socket member having an internal annular groove with an axially extending side wall and a transverse wall at one end of the groove, the opposite end of said groove being open and said transverse wall being spaced axially from said retaining means and being disposed at the opposite side of but closely adjacent said equatorial plane, a transverse shoulder extending radially outwardly from said opposite open end of said groove, a resilient O-ring disposed in said groove in engagement with said walls and engaging said ball member at said opposite side of and closely adjacent equatorial plane, said O-ring in its uncompressed state extending axially beyond said shoulder, and a substantially rigid annular compression member overlying said shoulder and said opposite open end of said groove in engagement with said O-ring for compressing the latter in response to attachment of the other end of said socket member to a faucet or the like and thereby effecting a fluid seal between said O-ring and said ball member, said shoulder being engageable by said compression member for limiting the extent of compression of said O-ring and said compression member when engaging said shoulder being wholly disposed within the confines of said socket member and encircling said ball member in close clearance relation approximately midway between said equatorial plane and said one end of said bore when the latter is in coaxial alignment with said socket member whereby to avoid abrading engagement of said O-ring by the edge of said one end of said bore during extreme swivel movement of said ball member relative to said socket member, said O-ring in its compressed state substantially filling the space defined between said ball member and said compression member and said walls with the clearance between said ball member and said opening at one side of said O-ring and the clearance between said compression member and said ball member at the opposite side of said O-ring being sufficiently restricted to resist extrusion of the compresed O-ring therebetween, and said compression member having an inner diameter slightly less than the maximum diameter of said ball member so as to overlie said O-ring and whereby said O-ring and said compression member coact to prevent inadvertent displacement of said ball member from sealing relation with said O-ring.

2. The structure of claim 1 further characterized in that said socket member is provided with both internal and external threads for attachment to an externally threaded or to an internally threaded faucet.

References Cited by the Examiner

UNITED STATES PATENTS

| | | | |
|---|---|---|---|
| 1,532,195 | 4/1925 | Morrison | 285—261 |
| 1,821,274 | 9/1931 | Plummer | 285—261 |
| 1,868,798 | 7/1932 | Kass | 285—8 |
| 2,396,005 | 3/1946 | Gross. | |
| 2,912,262 | 11/1959 | Franck | 285—348 |
| 2,971,701 | 2/1961 | Shames et al. | 285—261 |
| 2,990,122 | 6/1961 | Blumberg et al. | 239—587 |
| 3,075,792 | 1/1963 | Francic | 285—348 |

CARL W. TOMLIN, *Primary Examiner.*